United States Patent [19]
Ecer

[11] Patent Number: 6,048,432
[45] Date of Patent: Apr. 11, 2000

[54] METHOD FOR PRODUCING COMPLEX-SHAPED OBJECTS FROM LAMINAE

[75] Inventor: Gunes M. Ecer, Thousand Oaks, Calif.

[73] Assignee: Applied Metallurgy Corporation, Moorpark, Calif.

[21] Appl. No.: 09/020,842

[22] Filed: Feb. 9, 1998

[51] Int. Cl.[7] ....................................................... B23B 31/20
[52] U.S. Cl. .................. 156/263; 156/89.11; 156/256; 156/257; 156/289; 156/308.2; 156/322
[58] Field of Search .................. 156/89.11, 256, 156/257, 264, 289, 308.2, 322, 263

[56] References Cited

U.S. PATENT DOCUMENTS

| | | |
|---|---|---|
| 4,096,120 | 6/1978 | Grunke . |
| 4,423,120 | 12/1983 | Paulus et al. . |
| 4,588,551 | 5/1986 | Iijima et al. . |
| 4,612,689 | 9/1986 | De Wild et al. . |
| 4,673,549 | 6/1987 | Ecer . |
| 4,752,352 | 6/1988 | Feygin . |
| 5,019,197 | 5/1991 | Henderson . |
| 5,084,352 | 1/1992 | Percec et al. . |
| 5,226,953 | 7/1993 | Hodes et al. . |
| 5,277,723 | 1/1994 | Kodama et al. . |
| 5,397,621 | 3/1995 | Donzac et al. . |
| 5,443,615 | 8/1995 | Kuwabara et al. . |
| 5,514,232 | 5/1996 | Burns . |
| 5,516,582 | 5/1996 | Hikasa et al. . |
| 5,540,871 | 7/1996 | Uchida et al. . |
| 5,770,136 | 6/1998 | Huang . |
| 5,779,833 | 7/1998 | Cawley et al. . |

OTHER PUBLICATIONS

"Emerging Alternatives to Hot Isostatic Pressing", Ferguson, B. Lynn, *The international Journal of Powder Metallurgy & Powder Technology*, vol. 21, No. 3, pp. 201–218, 1985.

"Ceramics and Glasses", *Engineered Materials Handbook*, vol. 4, pp. 141–201.

"Powder Metallurgy" (Hot Isostatic Pressing of Metal Powders by Peter E. Price and Steven P. Kohler), *Metals Handbook Ninth Edition*, vol. 7, pp. 419–443.

*Primary Examiner*—Curtis Mayes
*Attorney, Agent, or Firm*—William W. Haefliger

[57] ABSTRACT

The process of forming a part from laminae of powders of materials such as metals, ceramics, intermetallics and composites of such materials, that include forming laminae; forming a stack of the laminae characterized as having a configuration from which a part is to be formed; heating the stack to consolidation temperature, and applying pressure to the heated stack to consolidate the laminae in the stack.

39 Claims, 8 Drawing Sheets

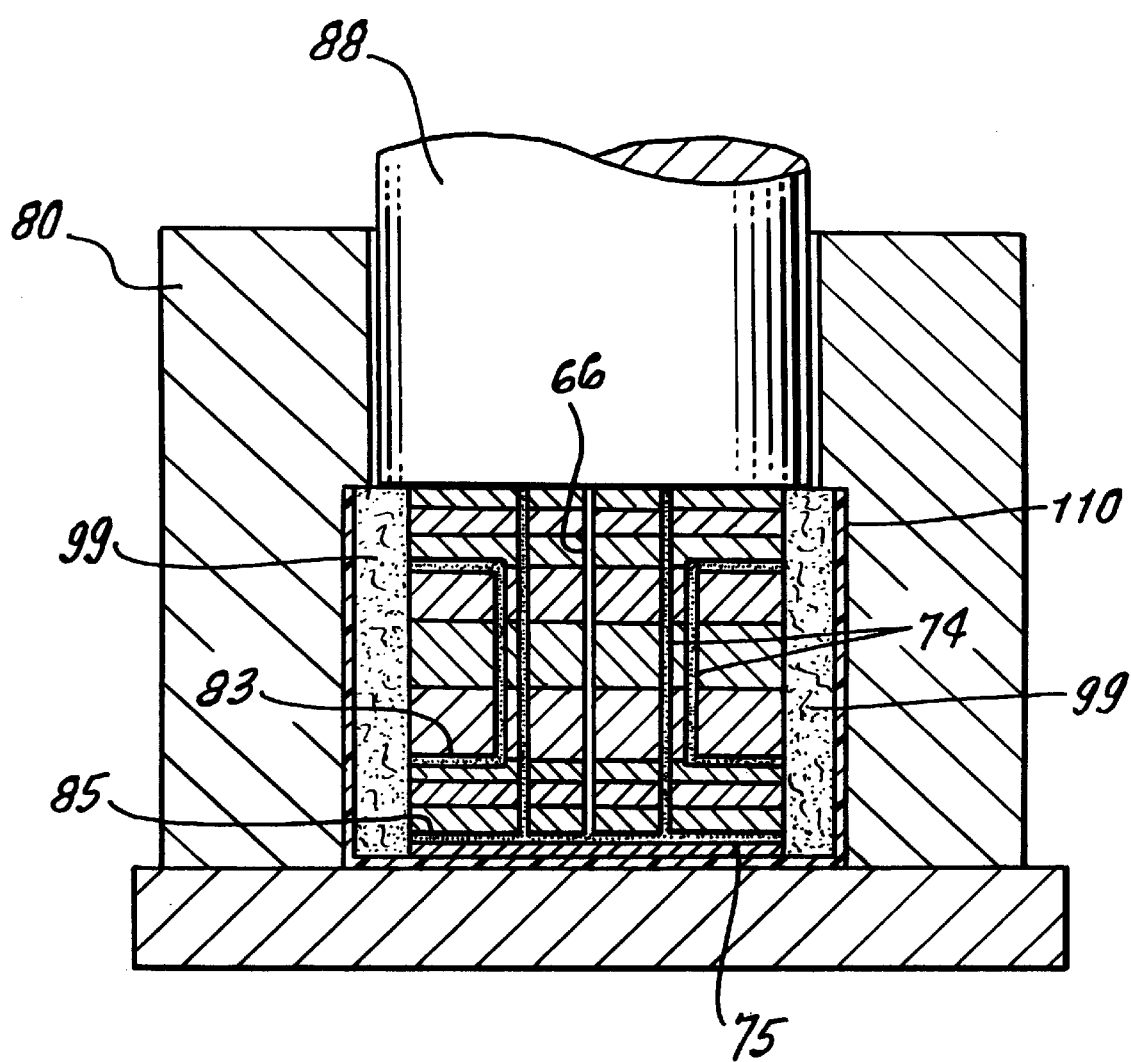

METHOD FOR PRODUCING COMPLEX-SHAPED OBJECTS FROM LAMINAE

BACKGROUND OF THE INVENTION

The present invention is directed to a process of forming fully dense, near net-shaped parts from green laminae of powders of engineering materials, such as metals, ceramics, intermetallics, and composite materials. More specifically, the present invention is related to a powder metallurgy process for production of complex-shaped engineering parts in a simple, straight walled die with pressure supplied by a simple press.

There is need for a more universal, highly automated fabrication process capable of producing complex shaped, highly robust, engineered parts from metals, ceramics, hybrid materials, and metal, glass or ceramic matrix composites. Such a process should meet demanding engineering requirements including one or more of the following: complex shape, full density, graded property, internal cavities, and low cost, and allow a quick turn-around from drawing to finished product.

There is also need for a universally applicable process as an alternative to the conventional fabrication processing techniques of casting, forging, machining, cutting, joining, and certain near net-shape processing techniques, including thermal spraying, powder metal forging, weld deposition, sintering, and vapor deposition.

Many deficiencies exist in materials processing methods, such as casting, forging, and hot isostatic pressing. These may be discussed under two categories: cost and performance.

COST

Structures that are highly engineered are difficult to fabricate and are frequently very costly. Some examples for these include parts that are complex in shape, require graded property, are actively cooled (through internal channels or cavities), incorporate materials that act as sensors and actuators (piezoelectric ceramics, magnetostrictive and shape-memory materials, and electrorheological fluids). At the present time, these requirements can only be met by large increases in the labor content of the part's manufacturing cost.

Complex shaped structural ceramics (and other hard to machine materials) parts are expensive because of the high cost of machining them to shape.

Additionally, products made by conventional metal forming techniques require long production lead times due to design and fabrication of required shaped hard dies. Long lead times lead to increased cost to the user and the fabricator. Costs increase further if mid-stream design changes must be implemented.

PERFORMANCE

Alternatives to the conventional materials processing methods are needed to achieve improvements in performance. The process which is the subject of this invention provides needed solutions in the following specific problem areas:

(a) Utilization of complex-shaped, load-bearing advanced ceramics is limited by structural flaw sizes and high cost of machining to shape.

In order to reduce flaw size in ceramic structures, high pressures and temperatures must be employed. Existing (axial) hot pressing techniques are limited by low applied pressure requirements associated with the low strength of the hard graphite die. Increasing the temperature could compensate for the low pressure, but this could also yield materials with inferior mechanical properties and coarsened microstructures. Sintering aids may be used to increase density, but these stay in the final product as grain boundary phases, which in turn influence the performances of the material, particularly at elevated temperatures. For a discussion of hot pressed structural ceramics, see an article by Andre Ezis in Engineered Mat. Handbook, Vol. 4, *Ceramics & Glasses*, ASM, Metals Park, Ohio, pp. 186–193, 1991.

Hot isostatic pressing of ceramic preforms can be accomplished at pressures up to 320 Mpa or two to three times the axial hot pressing pressure (see an article by Hans T. Larker, entitled "Hot Isostatic Pressing" in Engineered Materials Handbook, Vol. 4, *Ceramics & Glasses*, ASM, Metals Park, Ohio, pp. 194–201, 1991). However, since the pressure medium is an inert gas, the powder preform must be encapsulated in a glass or a metal enclosure or can, which also traps volatile impurities such as fluorine (remaining from powder purification process) and humidity. These trapped impurities lower material strength. Encapsulation is a costly process and is usually used for simple shapes. Injection molded parts produce the best dimensional accuracy, due to their high green density and uniformity which result from the use of an organic binder. Injection molded parts, however, are confined to small sizes for efficient removal of the binder. Other problems associated with isostatic pressing include distortion due to gravity and high cost of HIP equipment designed for high pressures.

In the process of the present invention, high uniformity and density of starting green ceramic sheets (no binder removal problems), use of a simple shaped die, and pressures in the range 600–1,000 Mpa from a simple axial press can lead to improved material properties as well as to increased size and shape complexity capability at a lower cost.

(b) Some applications require a gradual or sudden change in properties such as thermal conductivity, thermal expansion, wear resistance, electrical conductivity as a function of distance from part surface. Variation of properties cannot be produced by casting, forging, or extrusion. Lengthy secondary processing steps or long powder metallurgical approaches conventionally must be utilized.

By way of contrast, the process of the present invention is ideally suited to produce gradient property and multi-layer structures.

(c) Conventionally, internal channels and cavities are formed in a metal or ceramic part by machining and brazing or diffusion bonding two halves of the part. These high-temperature joining processes can detrimentally affect the mechanical and corrosion properties of the part, and increase its cost of fabrication.

(d) At present, near net-shape consolidation of complex shaped parts from powder metals continues to involve costly processes. Hot isostatic pressing (HIP) is one such process. As is well known in the art, in the HIP process, a powder part or compacted powder is subjected, at elevated temperatures, to equal pressure from all directions, the pressure being transmitted by a pressurizing inert gas, usually argon. Typical conditions of the HIP process range from 20 to 300 MPa. pressure (approximately 100 Mpa. being the average), and 480° C. to 1700° C. temperature. The HIP temperature depends greatly on the nature of the metal alloy being consolidated. A review of the state-of-the-art of HIP processing, as applied to metal powders, is given by Peter E. Price and Steven P. Kohler in "Hot Isostatic Pressing of Metal Powders", *Metals Handbook*, $9^{th}$ Edition, Vol. 7, ASM, Metals Park, Ohio, pp. 419–443. The high cost of pressure vessels and other equipment required for HIP canning of the compact before pressurization (to prevent oxidation and gaseous penetration of the consolidated product), the relatively long cycle time, and other factors, make HIP, overall, a costly process. Because of these and other disadvantages associated with HIP, several alternatives to the HIP process have emerged during recent years. Three of these alternatives, the CERACON process, Rapid Omnidirectional Compaction (ROC), and the STAMP process are described by Lynn Ferguson in an article titled "Emerging Alternatives to Hot Isostatic Pressing", International Journal of Powder Metallurgy and Powder Technology, Vol. 21(3), 1985.

The above noted alternatives to HIP attempt to approximate the isostatic pressure conditions of HIP while using conventional pressing equipment. In these alternatives, the pressurizing gas in the HIP vessel is replaced by a secondary pressing medium, which typically comprises granules of ceramic materials, glass or graphite. In these alternative processes, the advancing top punch of a conventional press pressurizes the secondary pressure medium, which transfers pressure to the workpiece. The result is consolidation of the workpiece under nearly isostatic conditions.

In these processes shape predictability is a major problem. A probable reason for this lies in the fact that, under pressure, plastic deformation of the compacting powder body of the manufactured object occurs at rates and directions which is defined by the elastic/plastic deformation of the surrounding medium. The compressibility ratios of the powder of the object and of the medium are not equal. Therefore, after pressing under a given set of pressure and temperature conditions, the achieved final densities (expressed as percentage of theoretical density) of the two materials are not equal. In light of this, it will be readily understood that if, for example, during pressing in the STAMP process full density is achieved in the powder mass of the manufactured part but not in the pressurizing medium, then the fully densified part being incompressible (its density can no longer be increased) continues to deform in the direction of the weaker and perhaps more openly packed pressurizing medium. This, of course, leads to distortion of the part. Frictional differences between the powder of the part and the surrounding medium also have a distorting effect in the STAMP and like processes, probably for reasons which are similar to the reasoning elucidated regarding compressibility differences.

A net result of the foregoing and related effects is that in the STAMP and like processes of the prior art (which substitute a non-gaseous secondary medium for the pressurizing gas of HIP) variations in the several processing parameters affect the final shape of the consolidated part, so that it is very difficult to hold close tolerances.

None of the powder metallurgy processes utilizing simple dies for consolidation of powders have considered the importance of relative compressibility of the pressurizing medium and of the powder of the manufactured part. An exception to this is a process disclosed in U.S. Pat. No. 4,673,549 by the inventor of the present invention. The disclosure in that patent offers a method comprising the steps of preparing a shaped, preferably ceramic, shell, placing it inside a metal or ceramic can, filling both the shell and space between the shell and the can with powder, out-gassing and sealing the can if necessary, heating the full can, and pressing it to consolidate the powder into a dense form; and separating the densified object within the shell from the densified shapes between the shell and the can.

The present invention provides a green powder laminae consolidation process for the production of near net-shape engineering parts. In the present invention laminae constitute both pressurizing medium and the part, and may be shaped to fit a simple shaped die (usually a cylindrical die). Therefore, laminate shape may be circular. Since there is no pressurizing medium, other than the green compacted powders of laminae, all laminae densify under applied load at the same rate. This eliminates or minimizes any distortion to the part shape during consolidation processing.

The invention differs in some significant ways from manufacturing method described by Feygin in U.S. Pat. No. 4,752,352. The method includes the steps of stacking individually contoured laminations to form a three-dimensional object, and bonding each lamination to the next lamination to form an integral object. While this approach could produce three-dimensional objects from compressed powder laminae, the method allows only processes like brazing and high energy beam (laser, electron-beam, plasma arc, etc.) melting to consolidate the part. Such forming operations taking place in free space exclude the application of high pressures to assist consolidation, since the part would have a tendency to spread in directions perpendicular to the applied load. Thus, the resultant part lacks the strength and chemical uniformity required of some of the demanding engineering applications. In the process provided by the present invention, consolidation takes place under high pressure and at elevated temperature to consolidate the part into a chemically uniform, substantially void free, high-strength part without melting or infiltrating with a molten material as in brazing. The present invention's novelty stems from its use of simple dies to produce complex shapes in fully dense state without significant grain growth, with elimination of need for a secondary material acting as the pressure transmitting medium. The process enables usage of separation compounds to create complex shapes.

The process of this invention is also highly suitable for fabrication of complex-shaped, near net-shape components from monolithic ceramics, Ceramic Matrix Composites (CMC's), Metal Matrix Composites (MMC's), intermetallics, and metals. Because the process is a high-pressure process, consolidation temperatures are used, which are lower than the temperatures required for sintering. This results in improved properties due to smaller grain size, and smaller structural flaws (voids and reaction layers).

SUMMARY OF THE INVENTION

It is a major object of the invention to provide an improved powder consolidation process, which avoids problems with prior processes, as referred to.

It is another object of this invention to provide a powder consolidation process involving the use of a conventional press and a simple shaped die to produce complex-shaped parts of near net-shape dimensions.

It is yet another object of the present invention to provide a powder consolidation process for producing engineering parts of near net-shape dimensions, in which compressibility related shrinkage problems are substantially eliminated, and where the dimensions shrink predictably in the direction of applied pressure.

It is a further object of the present invention to provide an improved powder consolidation process for inexpensively producing complex-shaped engineering parts.

It is still another object of the present invention to provide a parts manufacturing process wherein consolidation of powder mass takes place within a short time span, under high pressure, and at elevated temperature.

It is yet another object of the present invention to provide an improved powder consolidation process for producing engineering parts made of multi-materials.

It is yet another object of the present invention to provide a powder consolidation process for producing engineering parts having internal cavities and/or channels.

The process of the invention basically includes the following steps
 a) forming said laminae,
 b) forming a stack of the laminae characterized as having a configuration from which the part is to be formed,
 c) heating the stack to consolidation temperature,
 d) and applying pressure to the heated stack to consolidate the laminae in the stack.

As will be seen a process may typically include provision of a die cavity into which the heated laminae are placed, pressure being applied to the laminae stack in the die cavity.

As also will be seen, recesses, such as slots, may be formed in the laminae and introducing refractory parting substance into said recesses, prior to said heating; and refractory material may be introduced into such recesses. Also, refractory parting substance may be introduced between at least some of said laminae in said stack, prior to said heating; and excess consolidated material and refractory may be separated from the consolidated laminae part in the consolidated stack.

The laminae are typically formed to have sizes and shapes that densify under applied loading at substantially the same rate.

More specifically, the foregoing and objects and advantages may be attained by a process involving fabrication of an engineering part comprising the steps of first defining a compaction ratio as the ratio of the density of the part after consolidation to that of the powder laminae before consolidation; creating a three-dimensional solid design of the green part which is elongated in the direction of the applied pressure by a factor substantially equal to the compaction ratio; dividing the drawing of the elongated green part into imaginary or predetermined slices which when assembled together in the correct order would define the elongated green part; creating green powder laminae of predetermined density, size and shape in thicknesses corresponding to the thicknesses of the imaginary slices; cutting slots into each laminae to delineate surface contours of the green part at successive heights of the elongated green part; stacking the laminae in a preselected sequence to form the three-dimensional elongated green part within the inner volume defined by the slots; applying refractory powder on lateral surfaces of laminae to prevent bonding of part surfaces to excess material; filling the slots with a refractory powder; heating the laminae stack to a preselected consolidation temperature in a protective atmosphere if necessary; placing the heated laminae stack in a die; and applying a pressure to the laminae stack in the elongation direction until the green laminae stack is consolidated to a predetermined density; separating the consolidated laminae excess portions along the refractory powder filled slots and refractory powder applied surfaces to free the consolidated part located in the center portion of the laminae stack. The consolidated part then may be subjected to surface finishing or other secondary processing operations.

In an alternative embodiment of the process of the invention, the green laminate stack is placed in a metal or ceramic can prior to heating to the consolidation temperature. The metal or ceramic can may be reusable if the pressing die used has an enlarged die cavity portion where the can substantially remains unpressurized in the vertical direction during consolidation pressing. Here, the consolidation pressure applied to the elongated green laminated stack is assumed to be in the vertical direction.

In other alternative embodiments of the process of the invention, one or more of the laminae are different in composition or in density than the rest of the laminae so that multi-material, or coated, or gradient property parts may be manufactured.

In yet another alternative embodiment of the process of the invention, one or more of the laminae are grooved and machined in a predetermined way, and the grooves filled with chemically leachable material or tubes, to create parts with internal channels and/or cavities.

A significant advantage and important feature of the invention is that there is only minimal movement in the laminae powder in the direction perpendicular to the applied pressure. This is because laminate material is radially constricted by the die. The only volume available for the lateral expansion of the laminate material under pressure is the volume of the refractory powder filled slots surrounding the elongated green part. This expansion is minimal because the slot size is kept to a minimum, and much of the available slot volume is taken up by the refractory powder within the slots. As a consequence of this, substantially all of the shrinkage within the said elongated green part upon consolidation takes place in the direction of the applied pressure (vertical direction). Thus, the final part dimensions can easily be predicted from the elongated green part dimensions when the compaction ratio is known. This predictability of final part dimensions is an important advantage of the process of the present invention.

Refractory powders within the slots compact or densify upon consolidation of the part, but because these powders are selected for their refractoriness they do not consolidate into a strongly adherent layer nor do they form strong metallic bonds with the actual part after consolidation. Thus, refractory powder within the slots act as an easy parting layer. Refractory parting powders may also be applied on laminae surfaces perpendicular to the direction of the applied pressure when necessary to prevent bonding of these surfaces to the adjacent laminae surfaces. The refractory powder layer in fact becomes a continuous layer of separation surrounding the elongated green part before consolidation. After consolidation, the part is removed from the external material along the surface defined by the refractory powder layer.

In accordance with the present invention there is no intent to achieve nearly isostatic conditions during consolidation. The intent is to achieve consolidation through unidirectional application of the pressure with the expectation that the elongated green body of the object to be consolidated shrinks only in the direction of the applied pressure, and that the dimensions perpendicular to the direction of the pressure remain substantially the same after consolidation.

These and other objects and advantages of the invention, as well as the details of an illustrative embodiment, will be more fully understood from the following specification and figures, in which:

DRAWING DESCRIPTION

FIG. 15 is a cross-sectional view showing consolidation of a green powder laminae stack surrounded by a layer of refractory grain inside a reusable container (can). The can fits into the enlarged bottom portion of the hard die.

DETAILED DESCRIPTION

The following specification, taken in conjunction with the figures, sets forth the preferred embodiments of the present invention. The embodiments of the invention disclosed herein are the best modes contemplated by the inventor for carrying out his invention in a commercial environment, although it is understood that several modifications can be accomplished within the scope of the invention.

Figure 1:
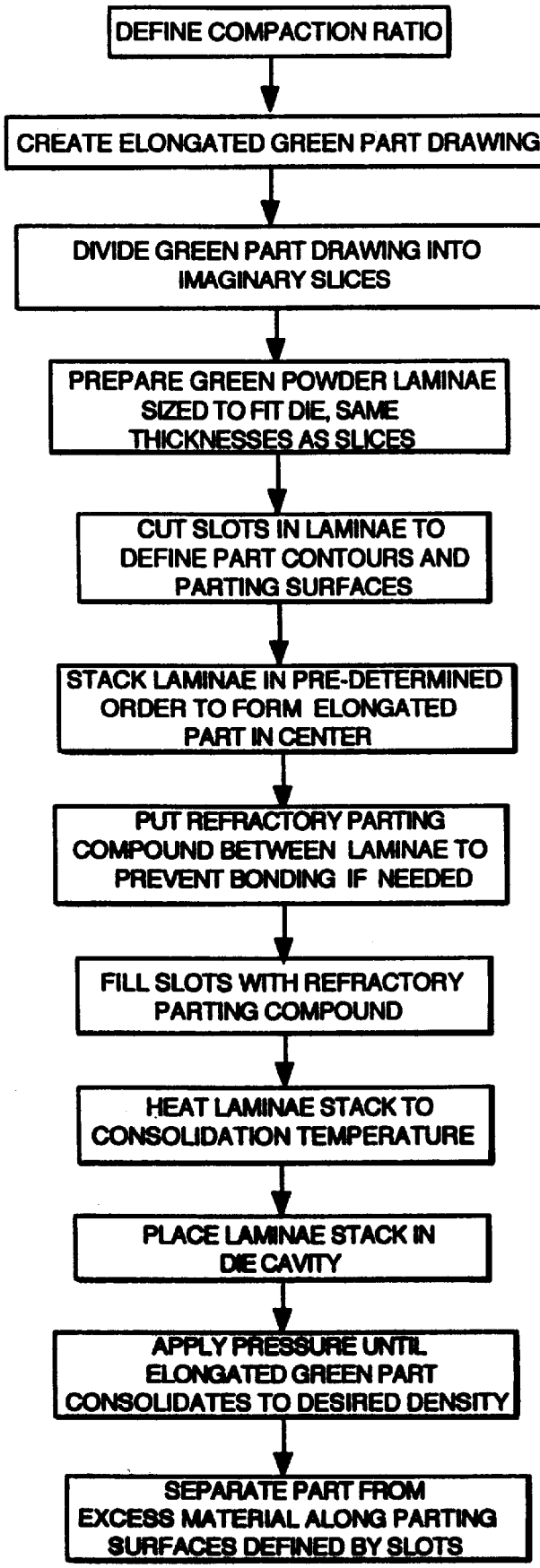
FIG. 1 is a flow diagram showing the steps of the process of the present invention.

FIG. 1 of the appended figures is a flow diagram which schematically illustrates the steps of the process of the present invention. As a first step of the process of the present invention, a compaction ratio, $\partial$, is defined as the ratio of the density of the part after consolidation (finished part) to green density of the powder laminae before consolidation. For products which in their final consolidated form are fully dense, compaction ratio can more specifically be defined by the equation $$\partial = d_t/d_g,$$

where $d_t$ = theoretical density of the material of the produced part
$d_g$ = green density of the powder laminae Here, it is assumed that the green density of the powder laminae is known. In a commercial plant, this is readily attainable because fabrication of green laminae can easily be standardized as will be discussed later in the text.

Once the compaction ratio is known, the finished part drawing is converted to the green part drawing by multiplying all vertical dimensions by $\partial$, and leaving all lateral dimensions virtually unchanged. In practice, lateral dimensions are slightly smaller than the final consolidated part dimensions to account for the small lateral expansion of the green part under pressure. For simplicity, this small lateral expansion and its effect on the calculation of vertical dimensions of the green part will be ignored in the present description of the process of this invention. Here, the word "Lateral" is defined as the direction perpendicular to the direction in which pressure is applied to the green part during consolidation. "Vertical dimensions" are those dimensions that are parallel to the direction in which the consolidation pressure is applied to the green part.

Figure 2:
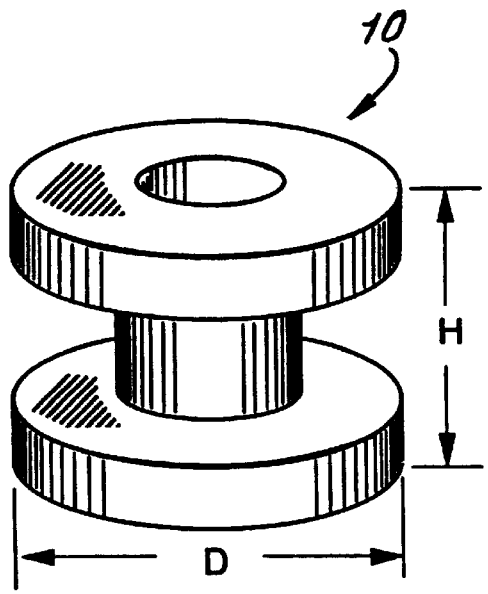
FIG. 2 is a perspective view of a sample consolidated (finished) part having a height of (H) and a diameter of (D)
Figure 3:
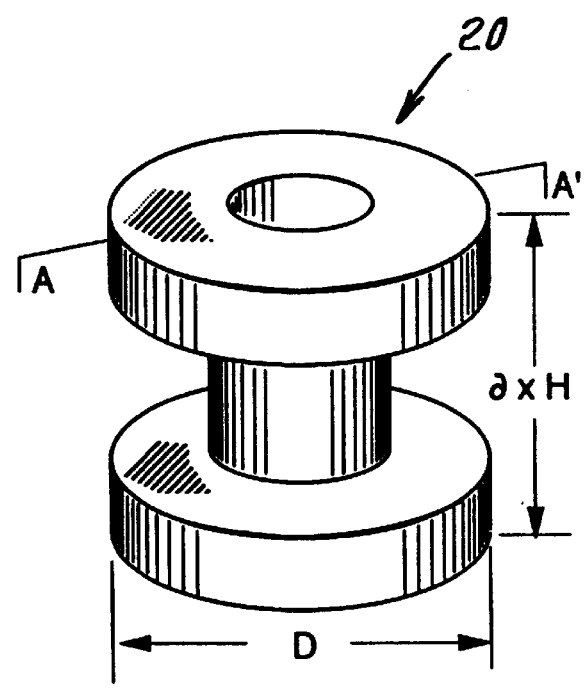
FIG. 3 is perspective drawing of the sample part of FIG. 2 before consolidation and while in green state. The green part having a height of ($\partial \times H$) and a diameter of (D)

FIG. 2 is a perspective drawing of an example of a finished (consolidated) part 10 having an outer diameter of D and a height of H. FIG. 3 is a perspective drawing of green part 20 derived from the dimensions of the finished part 10 by multiplying all vertical dimensions with $\partial$. Green part 20 has substantially the same lateral dimensions as the finished part 10. Outer diameter (D) of the finished part is nearly the same as the outer diameter of the green part 20. However, the green part height is equal to H×$\partial$, the height of the finished part (H) multiplied by the compaction ratio ($\partial$). Similarly, all vertical dimensions of the green part 20 are elongated in the vertical direction by the factor ($\partial$) in comparison with the same vertical dimensions of the finished part 10.

Figure 4:
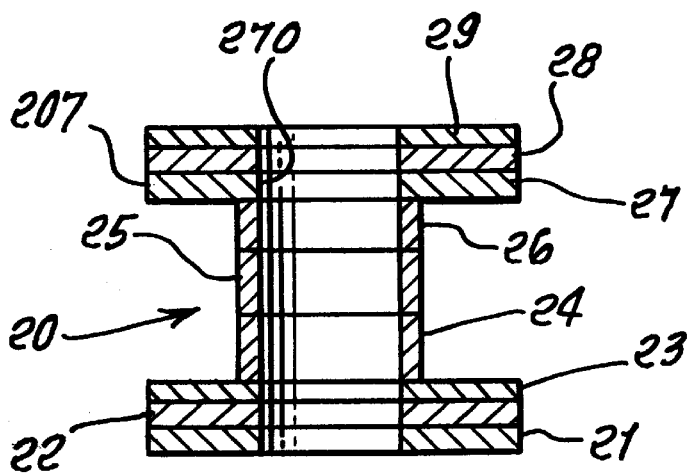
FIG. 4 is a cross-sectional drawing along the plane A–A' shown in FIG. 3. Green powder laminae which make-up the green part are individually identified.

In the next step of this process of this invention, drawing of the green part 20 is divided into imaginary horizontal slices 21 through 29, as seen in the cross-sectional view shown in FIG. 4. The cross-sectional view is taken along A–A' plane of green part 20 shown in FIG. 3. Imaginary slices 21 through 29 need not have the same thickness. Next, green powder laminae of predetermined density, and in thicknesses corresponding to the thicknesses of the imaginary slices 21–29 are produced. Green powder laminae density when multiplied with the compaction ratio ($\partial$) would be equal to the final density of the material after consolidation.

Figure 5:
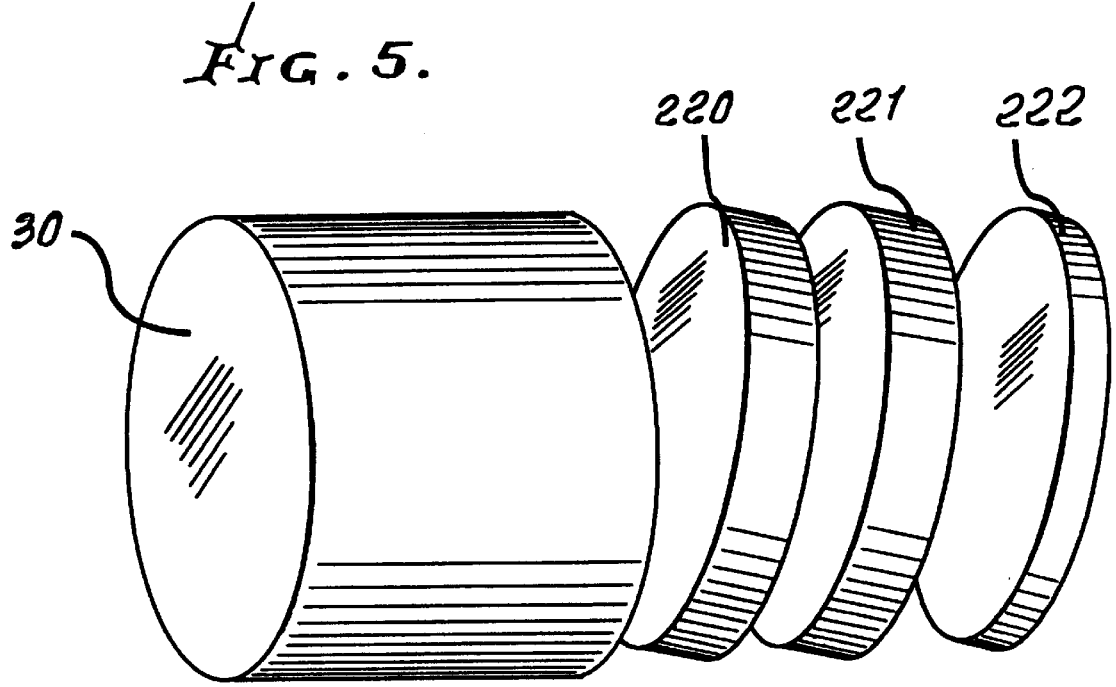
FIG. 5 is a perspective view of green metal powder laminae production from a cold-pressed and partially sintered billet by dry cutting.

Green powder laminae may be produced in several ways depending on the type of material. Powder metal (P/M) laminae may be in the form of cold-pressed P/M sheet, or cold-pressed and partially sintered sheet. Such sheet can be obtained by dry cutting cold-pressed or cold-pressed and partially sintered billets. Referring to FIG. 5, an example is given for the production of green powder metal (P/M) laminae 220, 221, and 222 from a cold-pressed and partially sintered billet 30. Laminae 220, 221, and 222 thicknesses are substantially identical to the thickness of slices 25, 26, and 27 of the drawing of the green part seen in FIG. 4.

Green metal laminae with a desired density can be manufactured by cold-pressing metal powder having known weight in a straight walled (cylindrical) die until the powder mass reaches a predetermined volume, and sintering the metal powder compact under predetermined time-temperature-atmosphere combination to impart to the compact the desired green density.

Green ceramic powder laminae may be produced in a number of different ways, including slip casting, roll compacting, dry pressing, extruding, and tape casting. These processes are well known in the ceramics industry, and brief descriptions of each may be found in Engineered Materials Handbook, Vol. 4, *Ceramics & Glasses*, ASM, Metals Park, Ohio, pp. 141–172, 1991.

Green powder laminae thicknesses which may be the same as the thickness of slices 21–29 on drawing of green part 20 in FIG. 4, may be chosen by considering part size, shape complexity slope of surface of part 10, whether the part is made of more than one material, and the practical laminae production capability. While the laminae thicknesses for most applications may be between 2–20 mm, in commercial practice a broader range can be expected ranging from several micro-meters to several centimeters. Green powder laminae intended as coating may be as thin as 1 m and may contain a fugitive binder for added green strength. Laminae should be strong enough to allow light handling stresses without breakage.

It is important that P/M and ceramic green powder laminae have uniform and high green densities to achieve tight dimensional tolerances. Conventional powder mixing and compaction methods already exists to accomplish this. At the same time, density of P/M laminae is desired to be less than 90% of theoretical density to create the inter particle shearing action necessary for development of high strength during consolidation.

Figure 6:
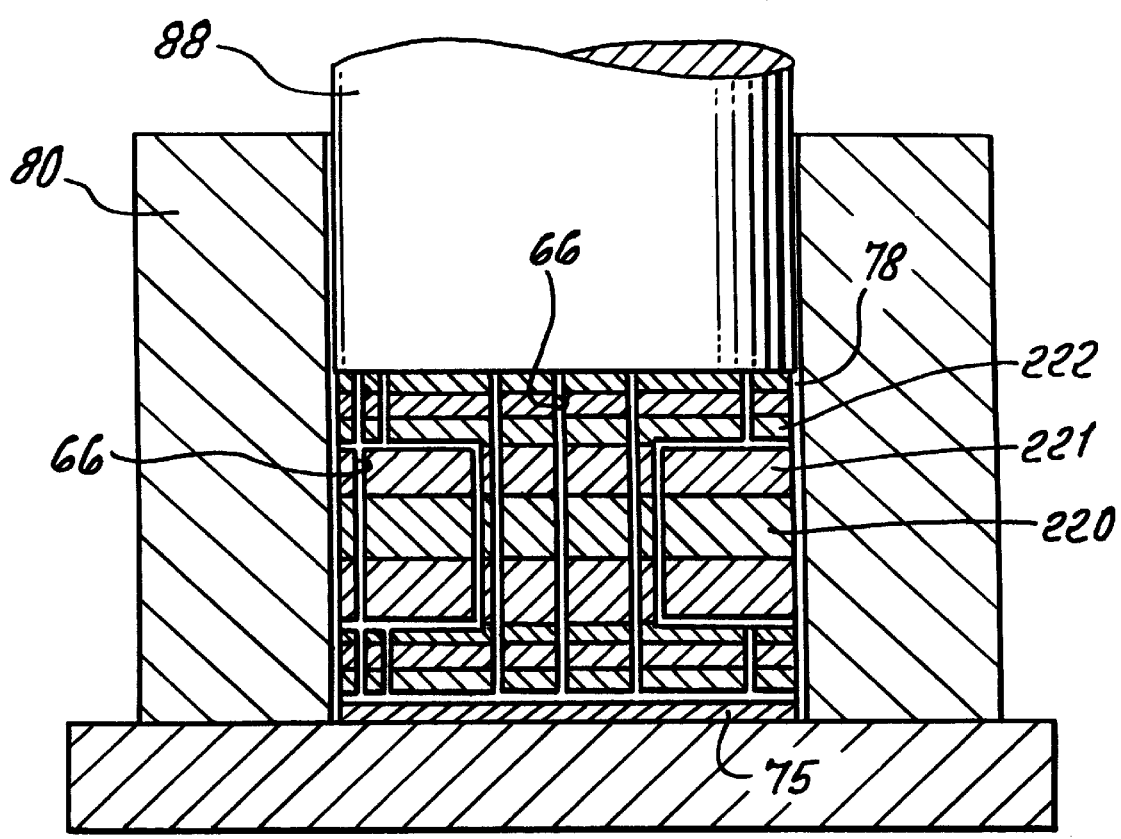
FIG. 6 is a cross-sectional view showing consolidation of a stack of green powder laminae inside of a cylindrical hard die, under pressure applied by a top punch.

Green powder laminae outer diameter is kept constant and slightly smaller than the internal diameter of the consolidation die to be used. This is necessitated by the practical problem of fitting the laminae stack into a die with relative ease. A more precise laminae outer diameter can be established by considering thermal expansion of laminae upon heating to the consolidation temperature and by allowing some clearance 78 between laminae and the internal diameter of the consolidation die 80 as seen in FIG. 6. Laminae outer shape may often be circular since the simplest of die shapes is cylindrical. However, if the part being fabricated has a shape that does not approximate a circle, laminae outer shape may be a square, a rectangular, an ellipse, a polygon, or an irregular shape. Die punch 88 would then have a cross-section similar to that of the die 80.

Figure 7:
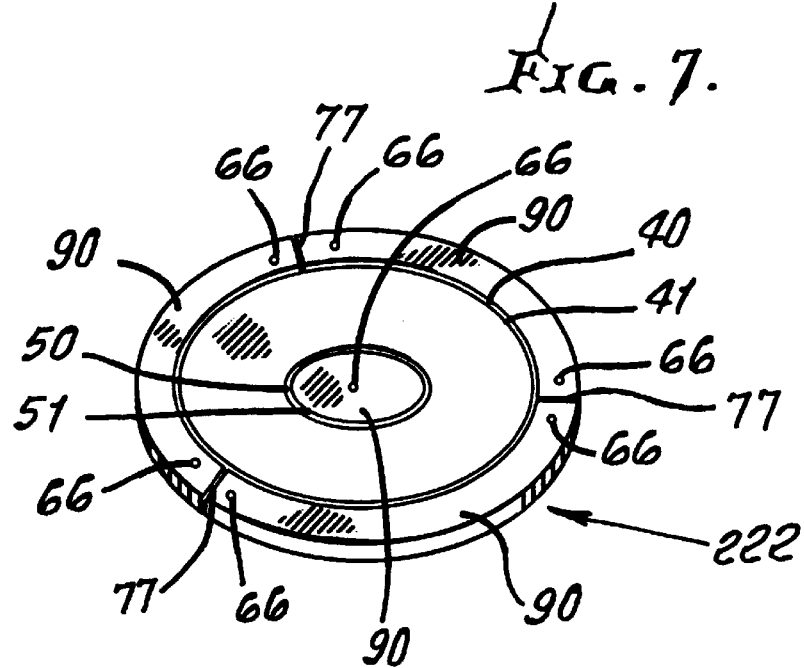
FIG. 7 is a perspective view of green powder laminae stack with alignment rods and a bottom support plate. The laminae stack at this stage of the process of the invention is ready to be heated to the consolidation temperature.

The next step in the process of the invention involves cutting slots into each laminae to delineate contours of the green part at successive heights of the elongated green part. This is illustrated in FIG. 7 where circular contour slots 40 and 50 are cut in a green lamina 222. Here, the inner surface 41 of circular slot 40 corresponds to the outer surface 207 of corresponding drawing slice 27 of green part 20 in FIG. 4, and outer surface 51 of slot 50 corresponds to the inner surface of hole 270 of slice 27 in FIG. 4. Holes 66 in FIG. 7 are alignment holes which are drilled into excess portions 90 of lamina 222 at the time of cutting slots 40 and 50. Holes 66 are drilled using laser beams or conventional drill presses. Methods of slot cutting include laser beam cutting and mechanical milling using conventional mill cutters. A medium powered slab discharge $CO_2$ laser (or a mill cutter) which can be mounted on a robot arm or a NC programmable x-y-Ø table can produce dross free edges.

For practical reasons, lateral dimensions of green part 20 (FIG. 4) are kept slightly smaller than those of finished part 10 to account for the small lateral expansion of green part 10 into slot cavities and into the gap 78 in FIG. 6 between laminae and die 80 during consolidation.

Referring again to FIG. 7, separation slots 77 are cut in excess portions 90 of the laminae to make it easier to separate excess portions 90 from consolidated part 10 after consolidation.

Figure 8:
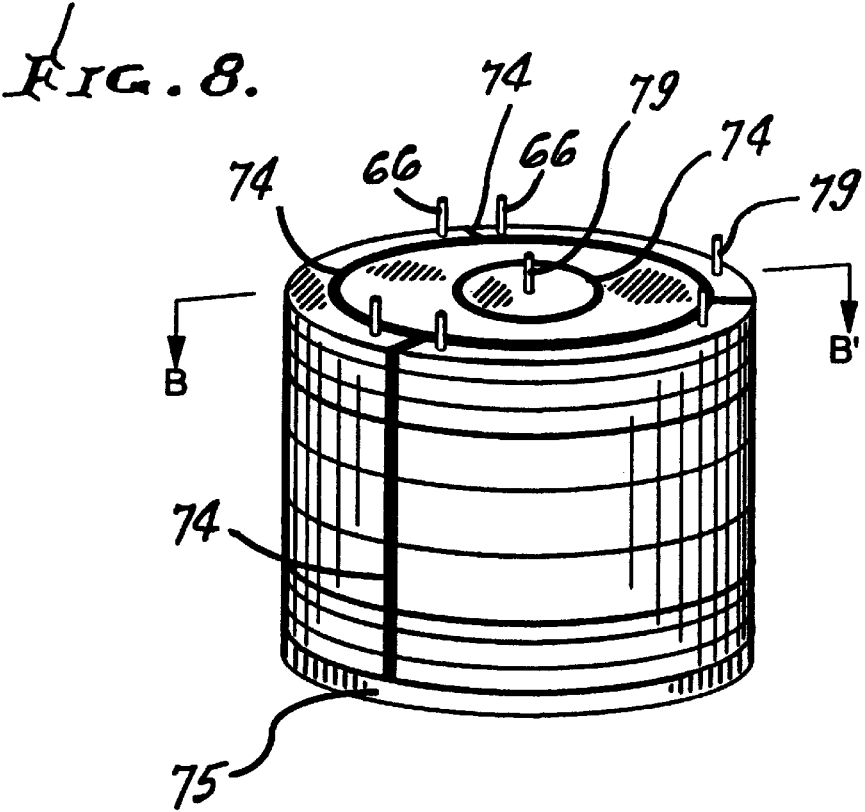
FIG. 8 is a perspective view of green powder laminae stack with alignment rods and a bottom support plate. The laminae stack at this stage of the process of the invention is ready to be heated to the consolidated temperature.

Slotted laminae are stacked as shown in FIG. 8 in a preselected sequence to assemble said three-dimensional elongated green part 20 within the inner volume defined by the contour slots cut in each laminae. Proper alignment of laminae may be accomplished by positioning laminae on a reusable support plate 75 with reusable alignment rods 79. Alignment rods 79 go through alignment holes 66, and are removed before consolidation of green part 20. It is understood that the process of stacking slotted laminae and handling of stack 60 in the shop can be mechanized, and that if mechanized alignment holes 66 and alignment rods 79 may not be necessary.

Figure 9:
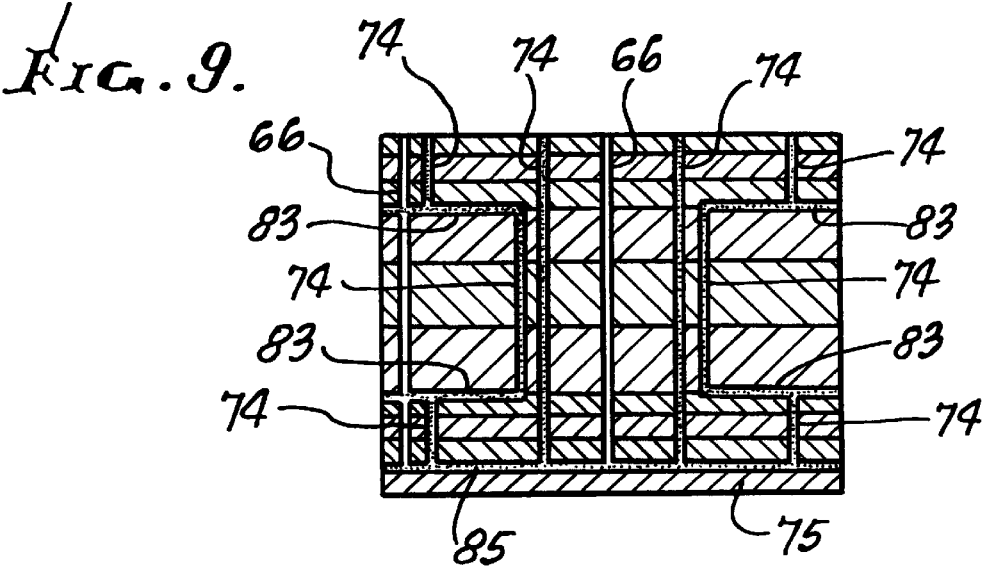
FIG. 9 is a cross-sectional view along the plane B–B' of green powder laminae stack shown in FIG. 8. Thick lines are refractory powder or cloth parting layers and alignment holes.

FIG. 9 is a cross-sectional view along plane B–B' indicated in FIG. 8. Referring to FIG. 9, it is seen that contour slots 40 and 50 cut in laminae are aligned to create a narrow, refractory filled vertical space 74 between green part 20 and excess portions 90. The space 74 will be filled with refractory material powder or refractory fiber cloth, refractory paper or refractory felt before the laminae stack 60 is heated to consolidation temperature. The intent is to create a refractory parting layer between green part 20 and excess portions 90. This parting layer will allow easy separation of excess portions 90 from consolidated part 10 after consolidation. However, the parting layer must continuously envelope green part 20 completely in order for the consolidated part 10 to be easily separated from excess portions 90 after consolidation. Therefore, filling of vertical space with refractory parting compounds 74 alone is not sufficient to create a continuous parting layer. Horizontal surfaces 83 seen on FIG. 9 must also contain parting compound. This is accomplished by applying a thin layer of refractory (parting) material onto the top surfaces of excess portions 90 of laminae numbered 23 and 26 (FIG. 4) during laminae stacking. Similarly, to prevent bonding of support plate 75 to the part 20 a parting layer 85 is applied on the top surface of support plate 75. Instead of refractory powder, parting layers 83 and 85 may be refractory fiber cloth or felt. Some of the refractory types for powder, cloth, or felt parting layers include oxides, carbides, nitrides, and borides of Si, Al, Zr, Ti, B, Ca, minerals made of various oxides and carbides and nitrides, and graphite, or their mixtures.

The next step of the process of this invention involves heating laminae stack 60 to a preselected consolidation temperature in a protective atmosphere if necessary; placing the heated laminae stack in die 80; and applying a pressure via punch 88 to laminae stack 60 in the elongation (vertical) direction until the height of green laminae stack 60 is reduced to the height of part 10, or consolidated to a predetermined density. Consolidation pressure is typically above the compressive yield strengths of the materials being consolidated at the consolidation temperature. The consolidation temperature is a temperature at which plastic deformation of laminae particles are possible under the applied pressure. If laminae are made of more than one type of material powder, some of the powder may be in a liquid state at the consolidation temperature.

Figure 10:
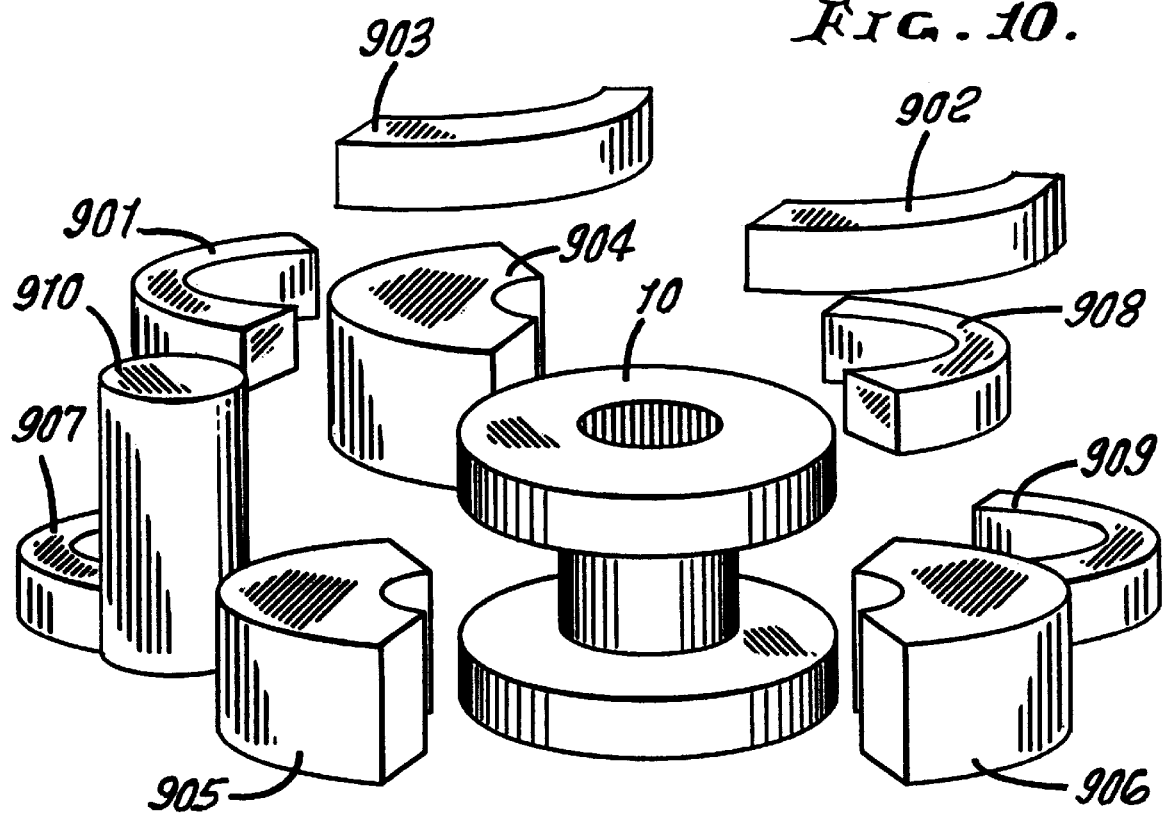
FIG. 10 is a perspective view of consolidated part and the consolidated excess portions after the green powder laminae stack shown in FIG. 8 is consolidated as shown in FIG. 6.
Figure 11:
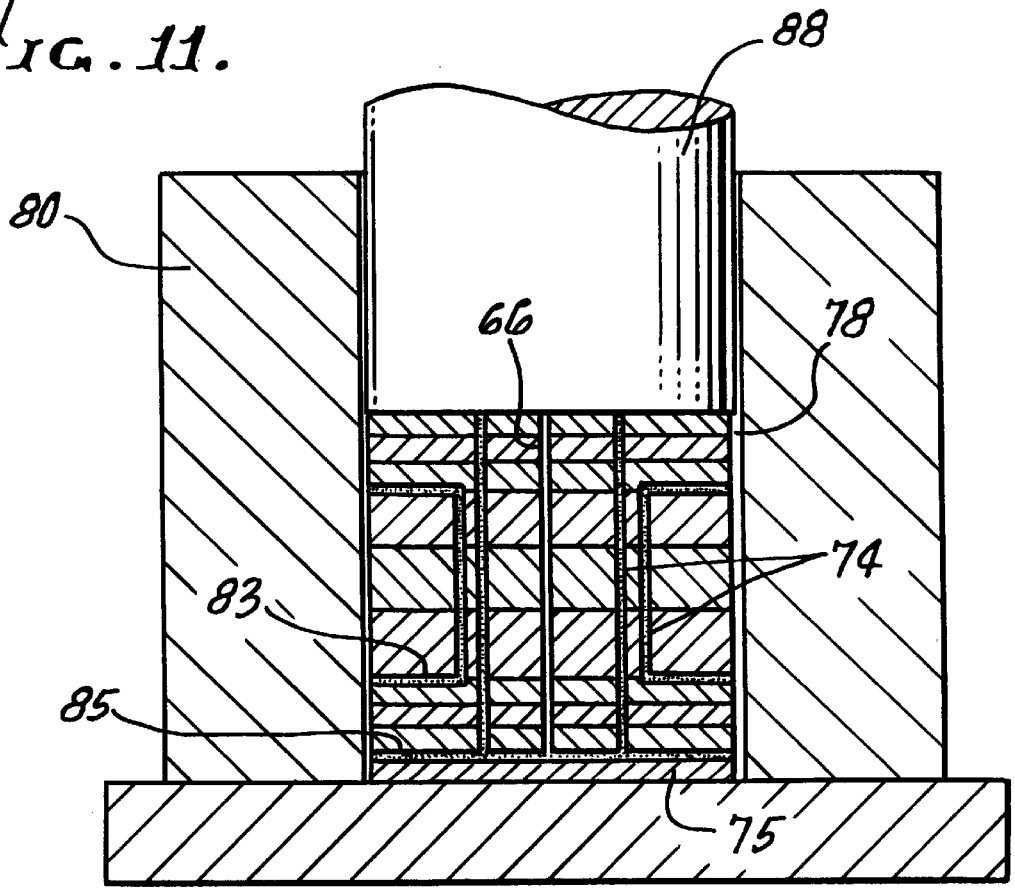
FIG. 11 is a cross-sectional view showing consolidation of a green powder laminae stack with minimal number of excess portions.
Figure 12:
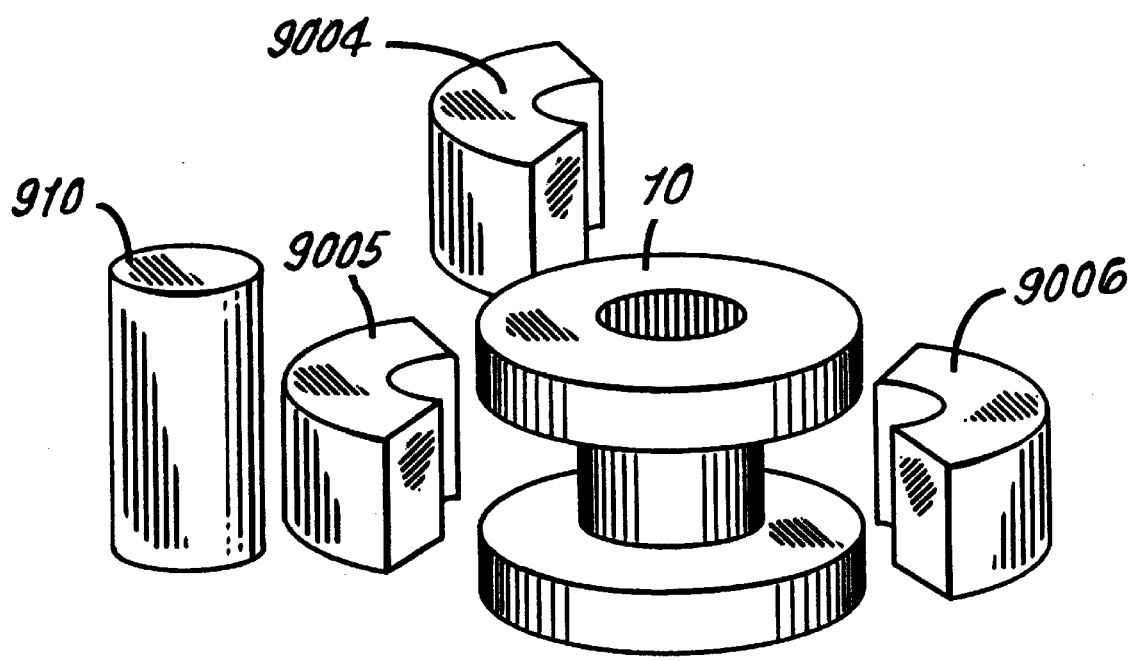
FIG. 12 is a perspective view of green powder laminae stack of FIG. 11, after the part is separated from excess portions along parting surfaces.

After consolidation, excess portions 901–910 and support plate 75 are separated from consolidated part 10 along parting surfaces 74, 83, and 85 (FIG. 9). FIG. 10 shows the excess portions 901 through 910 separated from consolidated part 10. The consolidated part may then be subjected to surface finishing or other secondary processing operations. As seen in FIG. 10, several excess portions may be created in the production of sample part 20. Some of these excess portions, thermally insulate part 20 from cold die 80 during consolidation, and this thermal insulation effect may be necessary for some materials. For materials where thermal insulation is not necessary, or where consolidation takes place in a heated die 80, the amount of excess portions produced can be minimized by eliminating some or all of the excess portions in contact with cold die 80, as seen in FIG. 11 where a cross-sectional view of consolidation of a green powder laminae stack with minimal number of excess portions is shown. FIG. 12 is a perspective view of the consolidated green powder laminae stack of FIG. 11, after the part is separated from excess portions along parting surfaces.

Figure 13:
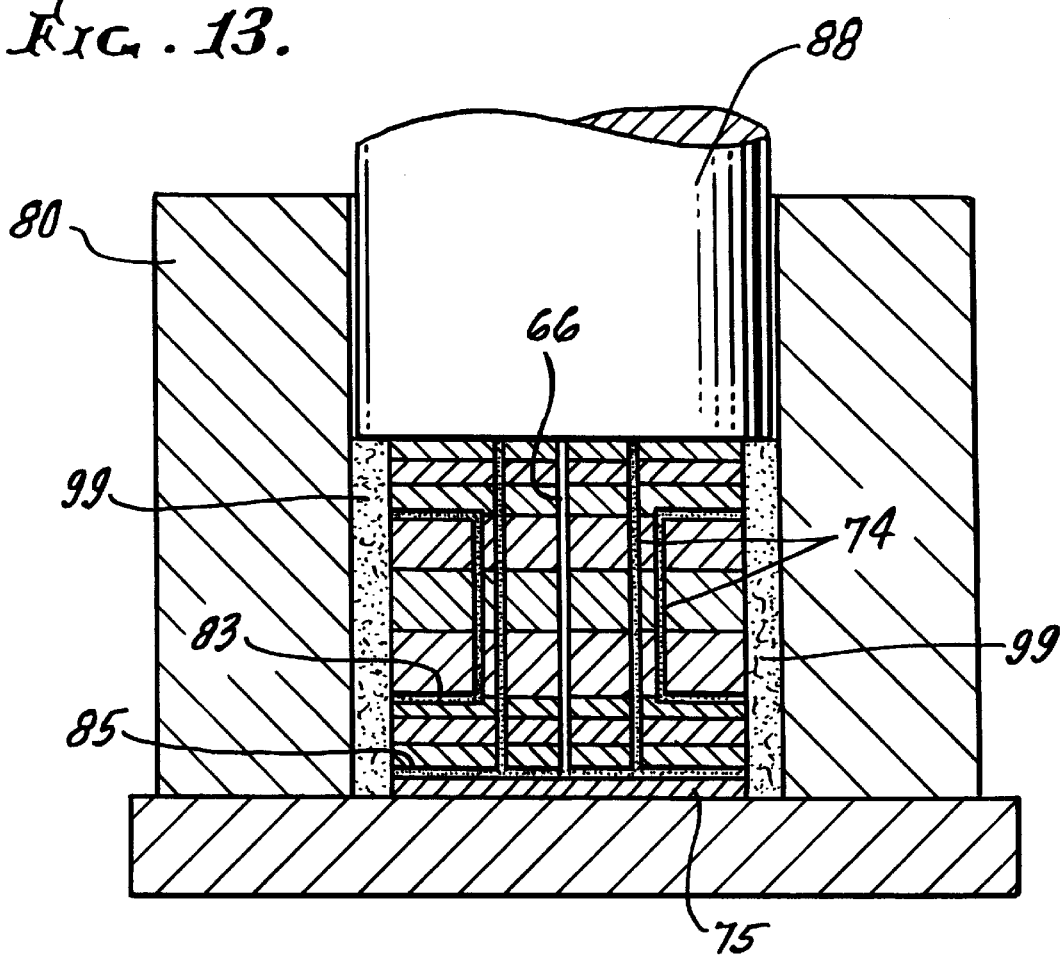
FIG. 13 is a cross-sectional view showing consolidation of a green powder laminae stack surrounded by a layer of refractory grain.

Green powder laminae stack 60 may also be insulated from die 80 by a layer of refractory grain 99 as seen in FIG. 13. Here, the grain 99 can be a mixture of various refractory powders and fibers including oxides, carbides, nitrides, borides, and graphite known to have heat resistant characteristics.

Figure 14:
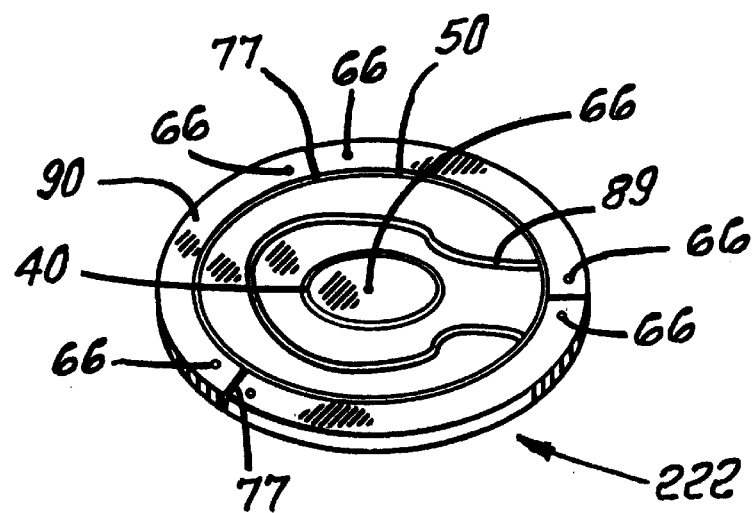
FIG. 14 is a perspective view of a lamina with separation slots, alignment holes, and a groove that can be used to circulate a coolant through the part while in service.

FIG. 14 is a perspective view of lamina 222 with separation slots 77, contour slots 40 and 50, alignment holes 66, and a groove 89 that can be used to circulate a coolant through the part while in service. A coolant tube may be placed in groove 89 before consolidation to create a high pressure coolant line. Groove 89 may also be filled with chemically leachable material (such as graphite), to create internal channels and/or cavities. After consolidation, leachable material may be chemically removed, or burned off.

Similarly, groove 89 may incorporate materials that act as sensors and actuators (piezoelectric ceramics, magnetostrictive and shape-memory materials, and electrorheological fluids.).

In another embodiment of the invention, green laminae stack 60 (FIG. 8) is placed in a metal or ceramic can 110 as shown in FIG. 15 before heating and or consolidation. In this case, to prevent damage to the can 110, hard die 80 is enlarged in the bottom portion enough to prevent can 110 to remain unaffected from the vertical component of the applied pressure. When necessary, the metal can may be evacuated and weld sealed to prevent oxidation of its contents in high temperature processing.

In another alternative embodiment of the process of the invention, one or more of the laminae are chemically different, in composition than the rest of the laminae so that multi-material, or coated, or gradient property parts may be manufactured. In a further embodiment, green density of one or more of the laminae may be different than the rest of the laminae. In fact before consolidation, one or more of the laminae may have densities equal to their theoretical densities.

A significant advantage and important feature of the invention is that there is only minimal movement and compaction in the laminae powder in the direction perpendicular to the applied pressure. This is because laminate material is radially constricted by the die. The only volume available for the lateral expansion of the laminate material is the volume of the refractory powder filled slots surrounding the elongated green part. This expansion is minimal because the slot size is kept to a minimum, and much of the available slot volume is taken up by the refractory powder within the slots. As a consequence of this, substantially all of the shrinkage within the said elongated green part upon consolidation takes place in the direction of the applied pressure (vertical direction). Thus, the final part dimensions can easily be predicted from the elongated green part dimensions if the compaction ratio is known. This predictability of final part dimensions is an important advantage of the process of the present invention.

Refractory parting compounds within the slots, and refractory grain 99 placed around the green laminae stack densify upon consolidation of the part, but because these powders are selected for their refractoriness they do not consolidate into a strongly adherent layer nor do they form strong bonds with the actual part after consolidation. Thus, refractory powder within the slots acts as an easy parting layer. Refractory parting powders, cloths, and felts may also be placed on laminae surfaces perpendicular to the direction of the applied pressure when necessary to prevent bonding of these surfaces to the adjacent laminae surfaces. The refractory powder layer in fact becomes a continuous layer of separation surrounding the elongated green part before consolidation. After consolidation, the part is removed from the external material along the surfaces defined by the refractory powder layer.

Heated green powder laminae stack under applied pressure join and consolidate into a metallurgically bonded part. Consolidation temperature and pressure are selected to cause plastic deformation of powder particles within laminae and to form a strong metallurgical bond. Consolidation temperature and pressure may vary depending on the material(s) being consolidated. For example, for low alloy steels typical consolidation temperature may be 1,000–1,050° C., and the consolidation pressure may be 300–400 MPa. For copper alloys these would typically be 650–700° C. and 125–175 MPa. respectively. For ceramics, consolidation temperatures may range between 1,100 and 1,800° C., and pressures may range between 300–1,000 MPa. Additionally, for ceramics and high melting point metals hard die 80 as seen in FIG. 13 may be water cooled, and the amount of refractory grain 99 may be increased to protect die 80 from excessive heat.

In accordance with the present invention there is no intent to achieve nearly isostatic conditions during consolidation. The intent is to achieve consolidation through unidirectional application of the pressure with the expectation that the elongated green body of the object to be consolidated shrinks only in the direction of the applied pressure, and that the dimensions perpendicular to the direction of the pressure remain substantially the same after consolidation.

In the light of the possibility for several modifications, the scope of the present invention should be interpreted solely from the following claims, as such claims are read in light of the disclosure.

EXAMPLE 1

Laminae measuring 50 mm diameter by 5 mm thickness were sectioned from a cold pressed and pre-sintered bar of Distalloy 4600 A, a powder metallurgy alloy produced by Hoeganaes Company, Riverton, N.J. This alloy has 1.50% by weight copper, 1.75% nickel, 0.5% molybdenum, and 0.1% carbon, remaining being iron. Green bar of the alloy was prepared by thoroughly mixing the −100 mesh alloy powder with 0.5% zinc stearate and 0.6% graphite, and cold pressing the blended powder mixture in a 50 mm lubricated tungsten carbide die under a pressure of 370 MPa. The green compact was then partially sintered for 15 minutes at 850° C. This treatment produced a green density of 6.7 g/cm$^3$ which is equivalent to 86% of the alloy's theoretical density. Nine laminae, each with identical diameters and nearly the same thicknesses were used to form a green laminae stack. Before stacking the laminae, slots were cut in each lamina to delineate the outer and inner contours of the part which was similar to the part shown in FIGS. 11 and 12. All slots were filled with boron nitride powder (parting compound). Additionally during stacking, Fiberfrax paper cut to shape was placed on surfaces identified as 83 in FIG. 11 as parting compound. Fiberfrax paper is made of silica and alumina fibers, and is manufactured by Unifrax Corporation, Niagara Falls, N.Y. The laminae stack was placed in a stainless steel can. A layer of Fiberfrax paper separated the bottom of the stack from the bottom of the can. The can and its contents were heated in a slightly reducing atmosphere to 1050 C., transferred into a cylindrical tool steel die and pressed under a pressure of 413 MPa., held under pressure for 3–4 seconds, and then pressure was released. After ejecting the consolidated stack out of the die, excess portions were separated from the part and removed as shown in FIG. 12. The measured consolidated part density was 100% of the theoretical density of the alloy, indicating that the green powder laminae had completely bonded to form a high strength integral part.

EXAMPLE 2

The part described in Example 1 above was produced from green powder laminae of silica. Silica powder with a mesh size of −325 was mixed in a colloidal silica suspension in water, and slip cast as a 5 mm thick sheet on water permeable cloth. The cast sheet was allowed to dry in air. Before it was completely dry, 50 mm diameter circles (laminae) were cut from the slip cast silica sheet. Nine dried silica laminae were used to create a green laminae stack as described in Example 1 above with separation slots filled with a 50—50 mixture of boron nitride and graphite. The same parting compound mixture was applied onto the separation surfaces (surfaces identified as 83 in FIG. 11). The stack was placed in a stainless steel can lined with graphite coating. The can and its contents were heated to 1100° C., transferred into a cylindrical tool steel die and pressed under a pressure of 345 MPa., held under pressure for 3–4 seconds, and then pressure was released. After ejecting the consolidated stack out of the die, excess portions were separated from the part and removed as shown in FIG. 12. The measured consolidated part density was 100% of the theoretical density of silica ceramic, indicating that the green powder laminae had completely bonded to form a high strength integral part.

EXAMPLE 3

Experiment described in Example 1 was repeated with the following exceptions. The top lamina was a cold pressed −325 mesh powder of ($Ti_{52} Al_{48}$) titanium aluminide intermetallic. Above the top lamina, a 2 $\mu$m thick film of a mixture of 80% tungsten carbide and 20% iron powders in a fugitive binder was placed as a wear resistant coating. Fugitive binder was a mixture of cellulose acetate in acetone. Once dried, the film could be cut to shape and easily handled. After the stack was heated to 400° C. for ten(10) minutes in a protective atmosphere to remove the fugitive binder, cooled to room temperature, the laminae stack was placed in a graphite coated stainless steel can, the can was welded and evacuated, and weld sealed, heated to 1100° C. and pressed under a pressure of 370 MPa. After ejecting the consolidated stack out of the die, the can was cut off and removed, excess portions were separated from the part and removed as shown in FIG. 12. It was found that the multi material part has completely bonded to form a high strength integral part with a wear resistant top surface coating.

The die used in the above experiments had an enlarged bottom portion into which the stainless steel can could fit as shown in FIG. 15.

In accordance with the present invention there is no intent to achieve nearly isostatic conditions during consolidation. The intent is to achieve consolidation through unidirectional application of the pressure with the expectation that the elongated green body of the object to be consolidated shrinks only in the direction o the applied pressure, and that the dimensions perpendicular to the direction of the pressure remain substantially the same after consolidation.

In the light of the possibility for several modifications, the scope of the present invention should be interpreted solely from the following claims, as such claims are read in light of the disclosure.

I claim:

1. The process of forming a part from laminae of powders of materials selected from the group consisting of metals, ceramics, intermetallics and composites of such materials, that includes
    a) forming said laminae,
    b) forming a stack of said laminae characterized as having a configuration from which said part is to be formed,
    c) heating said stack to consolidation temperature,
    d) and applying pressure to the heated stack to consolidate the laminae in the stack,
    e) and providing a die cavity, into which the heated laminae are placed, said pressure applied to the laminae stack in the die cavity.
2. The process of claim 1 including forming recesses in said laminae and introducing refractory parting substance into said recesses, prior to said heating.
3. The method of claim 2 wherein at least some of said recesses have slot configuration.
4. The process of claim 2 including separating excess materials from the consolidated laminae in the consolidated stack.
5. The process of claim 1 including introducing refractory parting substances into zones between at least some of said laminae in said stack, prior to said heating.
6. The process of claim 5 including separating excess refractory substances from the consolidated laminae in the consolidated stack.
7. The process of claim 1 wherein said laminae are formed to have sizes and shapes that densify under applied loading at substantially the same rate.
8. The process of claim 1 wherein said applied pressure effects bonding of adjacent laminae.
9. The process of claim 1 wherein said consolidation is continued at elevated temperatures to produce an integral high strength part which is void free.
10. The process of claim 1 wherein all laminae in the stack are caused to densify at the same rate.
11. The process of claim 1 wherein said laminae consist of material selected from the group:
    i) ceramic
    ii) metal
    iii) intermetallics.
12. The process of claim 1 wherein said stack before consolidation has a longitudinal dimension H and a lateral dimension D, wherein H≈∂×longitudinal dimension of the completed or formed part D≈lateral dimension of the completed or formed part, and ∂=$d_t/d_g$ where $d_t$=theoretical density of the material of the produced part $d_g$=the green density of the powder laminae in the stack.
13. The process of forming a part from laminae of powders of materials selected from the group consisting of metals, ceramics, intermetallics and composites of such materials, that includes
    a) forming said laminae,
    b) forming a stack of said laminae characterized as having a configuration from which said part is to be formed,
    c) heating said stack to consolidation temperature,
    d) and applying pressure to the heated stack to consolidate the laminae in the stack,
    e) and including placing said stack in a metal or ceramic can prior to said heating, and employing a pressure die to pressurize the stack in the can.

14. The process of claim 13 including radially constricting all laminae in the stack, during said pressurizing.

15. The process of claim 14 including allowing expansion of laminae material into slots formed adjacent the laminae in the stack, during said pressurizing.

16. The process of claim 15 including providing refractory powder in said slots to receive pressurization exerted by the laminae in the stack, the refractory powder selected to resist bonding during said pressurization.

17. The process of claim 16 including removing refractory powder from the slots after said consolidation.

18. The process of forming a part from green powder laminae, the powder selected from the group consisting of metals, ceramics, intermetallics and composites of such materials that includes the steps of
  a) forming said laminae, said laminae having less than theoretical density,
  b) cutting slots in each lamina along surface contours of the part and along separation surfaces, said slots separating the green part from excess material portions,
  c) forming a stack of said laminae in a predetermined order to form said part in green form, and in the process of forming said stack, applying refractory parting compounds on laminae surfaces where bonding is not desired, and filling said slots with refractory parting compounds,
  d) heating said stack to consolidation temperature,
  e) applying pressure to the heated stack to consolidate the laminae in the stack,
  f) separating consolidated excess portions from the consolidated part along surfaces defined by said parting compounds,
  g) and providing a die cavity into which the heated laminae stack is placed, said pressure applied to the laminae stack in the die cavity.

19. The process of claim 18 wherein the die cavity has a wall, and that includes providing a layer of refractory grain between said die cavity wall and laminae stack prior to applying said pressure.

20. The process of claim 18 wherein at least one of said laminae has a composition different than that of the rest of the laminae.

21. The process of claim 18 wherein at least one of said laminae consists of metals or ceramics or intermetallics powders or their mixtures in a fugitive binder.

22. The process of claim 18 wherein at least one of said laminae has a gradient of composition within itself.

23. The process of claim 18 wherein at least one of said laminae has grooves and or cavities.

24. The process of claim 18 wherein at least one of said laminae has a density different than that of other laminae.

25. The process of claim 24 wherein at least one of said laminae has a density equal to its theoretical density.

26. The process of forming a part from green powder laminae said powder selected from the group consisting of metals, ceramics, intermetallics and composites of such materials, that includes the steps of
  a) forming said laminae, said laminae having less than theoretical density,
  b) cutting slots in said laminae along surface contours of the part and along separation surfaces, said slots separating green part from excess material portions,
  c) forming a stack of said laminae in a predetermined order to form said part in green form, and in the process of forming said stack, applying refractory parting compounds on laminae surfaces where bonding is not desired, and filling said slots with refractory parting compounds,
  d) heating said stack to consolidation temperature,
  e) applying pressure to the heated stack to consolidate the laminae in the stack,
  f) separating consolidated excess portions from the consolidated part along surfaces defined by said parting compounds,
  g) and including placing said stack in a metal or ceramic can prior to said heating, and applying pressure in a die cavity to pressurize said stack in said can.

27. The process of claim 26 wherein the die cavity has an enlarged portion into which said can fits; the can remaining unaffected by vertical component of said applied pressure.

28. The process of claim 27 that includes providing a layer of refractory grain between said can and said laminae stack prior to applying said pressure.

29. The process of claim 26 that includes providing a layer of refractory grain between said can and said laminae stack prior to applying said pressure.

30. The process of forming a part from green powder laminae said powder selected from the group consisting of metals, ceramics, intermetallics and composites of such materials that includes the steps of:
  a) forming said laminae; said laminae having less than theoretical density and substantially the same diameter,
  b) cutting slots in each lamina along surface contours of the part and along separation surfaces; said slots separating green part from excess material portions,
  c) forming a stack of said laminae in a predetermined order to form said part in green form, and in the process of forming said stack, applying refractory parting compounds on laminae surfaces where bonding is not desired, and filling said slots with refractory parting compounds,
  d) heating said stack to consolidation temperature,
  e) placing said heated stack in a simple shaped die cavity, said die cavity sized to be slightly larger than the diameter of laminae,
  f) applying pressure to the heated stack to consolidate the laminae in the stack,
  g) and separating excess portions and refractory parting compounds from the consolidated part along surfaces defined by said parting compounds.

31. The process of claim 30 including placing said stack in a metal or ceramic can prior to said heating.

32. The process of claim 31 wherein the die cavity has an enlarged portion into which said can fits; the can remaining unaffected by vertical components of said applied pressure.

33. The process of claim 31 that includes providing a layer of refractory grain between said can and laminae stack prior to applying said pressure.

34. The process of claim 30 that includes providing a layer of refractory grain between said die cavity wall and said laminae stack prior to applying said pressure.

35. The process of claim 30 wherein at least one of said laminae has a composition different than that of the rest of the laminae.

36. The process of claim 30 wherein at least one of said laminae consists of metals or ceramics or intermetallics powders or their mixtures in a fugitive binder.

37. The process of claim 30 wherein at least one of said laminae has a gradient of composition within itself.

38. The process of claim 30 wherein at least one of said laminae has grooves and/or cavities machined into it; said grooves and cavities filled with leachable material.

39. The process of forming a part from laminae of powders of materials selected from the group consisting of metals, ceramics, intermetallics and composites of such materials, that includes a) forming said laminae, b) forming a stack of said laminae characterized as having a configuration from which said part is to be formed, c) heating said stack to consolidation temperature, d) and applying pressure to the heated stack to consolidate the laminae in the stack, e) said process also including first defining a compaction ratio as the ratio of the density of the part after consolidation to green density of the powder laminae before consolidation; creating a three-dimensional solid design of the green part which is elongated in the direction of the applied pressure by a factor substantially equal to the compaction ratio; dividing the design of the elongated green part into imaginary slices which when assembled together in the correct order would define the elongated green part; creating green powder laminae of predetermined density, size and shape in thicknesses corresponding to the thicknesses of the imaginary slices; cutting slots into each laminae to delineate surface contours of the green part at successive heights of the elongated green part; stacking the laminae in a preselected sequence to form the three-dimensional elongated green part within the inner volume defined by the slots; and when stacking said laminae, applying refractory parting compound on surfaces of laminae where bond formation is to be prevented, and filling the slots with a refractory powder; heating the laminae stack to a preselected consolidation temperature in a protective atmosphere if necessary; placing the heated laminae stack in a die; and applying a pressure to the laminae stack in the elongation direction until the green laminae stack is consolidated to a predetermined density; separating the consolidated laminae excess portions along the refractory powder filled slots to free the consolidated part located in the center portion of the laminae stack.

* * * * *